United States Patent
Shindo (10) Patent No.: US 11,652,360 B2
(45) Date of Patent: May 16, 2023

(54) IN-VEHICLE BACKUP CONTROL APPARATUS AND IN-VEHICLE BACKUP APPARATUS

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Hao Shindo, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 17/529,433

(22) Filed: Nov. 18, 2021

(65) Prior Publication Data

US 2022/0166249 A1 May 26, 2022

(30) Foreign Application Priority Data

Nov. 26, 2020 (JP) .............................. JP2020-195784

(51) Int. Cl.
*H02J 9/06* (2006.01)
*H02J 7/00* (2006.01)
*B60W 50/023* (2012.01)
*B60W 50/02* (2012.01)

(52) U.S. Cl.
CPC ........... *H02J 9/061* (2013.01); *B60W 50/023* (2013.01); *B60W 50/0225* (2013.01); *H02J 7/0048* (2020.01); *H02J 7/0063* (2013.01); *H02J 7/007182* (2020.01)

(58) Field of Classification Search
CPC .... H02J 9/061; H02J 7/0048; H02J 7/007182; H02J 7/0063; B60W 50/0225; B60W 50/023
USPC ......................................................... 307/10.1
See application file for complete search history.

(56) References Cited

U.S. PATENT DOCUMENTS

| 8,269,641 | B2 * | 9/2012 | Bauman ................... H02J 7/14 320/132 |
| 2020/0262301 | A1 * | 8/2020 | Sasahara ................ B60L 53/32 |

FOREIGN PATENT DOCUMENTS

JP 2009-296808 A 12/2009

* cited by examiner

*Primary Examiner* — Michael R. Fin
(74) *Attorney, Agent, or Firm* — Honigman LLP (57) ABSTRACT

An in-vehicle backup control apparatus includes a discharge circuit that discharges a power storage unit and a control unit that controls the discharge circuit. The control unit sets either one of a superimposable voltage or a supply completion voltage as an interruption threshold value, the superimposable voltage being set as a voltage condition of the power storage unit when electric power is supplied simultaneously to a plurality of target loads during an abnormal state, and the supply completion voltage being set in association with one of the plurality of target loads. The control unit interrupts or delays the supply of electric power to the one of the plurality of target loads to prohibit the plurality of target loads from simultaneously operating if a charge voltage of the power storage unit reaches a value less than or equal to the interruption threshold value during the abnormal state.

16 Claims, 2 Drawing Sheets

FIG. 1

FIG. 2 ively operate despite the fact that the energy stored in the power storage unit has fallen below the amount of energy required for the plurality of loads to simultaneously operate, electric power may not be appropriately supplied to the loads.

IN-VEHICLE BACKUP CONTROL APPARATUS AND IN-VEHICLE BACKUP APPARATUS

CROSS-REFERENCE TO RELATED APPLICATIONS

This application claims priority of Japanese Patent Application No. JP2020-195784 filed on Nov. 26, 2020, the contents of which are incorporated herein.

TECHNICAL FIELD

The present disclosure relates to an in-vehicle backup control apparatus and an in-vehicle backup apparatus.

BACKGROUND

JP 2009-296808A discloses a power storage apparatus that supplies electric power from a power storage unit to a load when the voltage of a main power supply is low. A control circuit included in the power storage apparatus controls a charging circuit when the main power supply is in normal operation, and thereby charges the power storage unit. Then, when the voltage of the main power supply is low (for example, when the engine is activated after a start-stop operation), the control circuit turns on a switch provided between the power storage unit and the load, and supplies electric power to the load. JP 2009-296808A also discloses that the power storage apparatus is also applicable to a power supply backup system used when the main power supply is not in normal operation.

JP 2009-296808A is an example of related art.

The in-vehicle backup apparatus performs a backup operation of supplying electric power to a plurality of loads by using the power storage unit that is different from the main power supply when a failure occurs in the main power supply. However, when the plurality of loads simultaneously operate, a problem may occur due to the plurality of loads operating simultaneously. For example, if the plurality of loads simultaneously operate despite the fact that the energy stored in the power storage unit has fallen below the amount of energy required for the plurality of loads to simultaneously operate, electric power may not be appropriately supplied to the loads.

The present disclosure provides a technique with which electric power can be supplied to a plurality of loads more appropriately during a backup operation that uses a power storage unit.

SUMMARY

An in-vehicle backup control apparatus that is one aspect of the present disclosure is an in-vehicle backup control apparatus to be used in an in-vehicle power supply system including a power supply unit and a power storage unit, and is configured to perform a backup operation of supplying electric power to at least a plurality of target loads based on electric power from the power storage unit during an abnormal state in which the voltage of a conductive path through which electric power from the power supply unit is supplied is less than a threshold value, the in-vehicle backup control apparatus including: a discharge circuit that discharges the power storage unit; and a control unit that controls the discharge circuit, wherein the control unit is configured to: set either one of a superimposable voltage or a supply completion voltage as an interruption threshold value, the superimposable voltage being set as a voltage condition of the power storage unit when electric power is supplied simultaneously to the plurality of target loads during the abnormal state, and the supply completion voltage being set in association with one of the plurality of target loads; and interrupt or delay the supply of electric power to the one of the plurality of target loads to prohibit the plurality of target loads from simultaneously operating if the following condition is satisfied: a charge voltage of the power storage unit reaches a value less than or equal to the interruption threshold value during the abnormal state.

With the technique according to the present disclosure, electric power can be supplied to the plurality of loads more appropriately during the backup operation that uses the power storage unit.

DETAILED DESCRIPTION OF PREFERRED EMBODIMENTS

Hereinafter, aspects of an embodiment according to the present disclosure are listed and shown. The features shown in aspects 1-6 given below may be combined in any way as long as the combination is not contradictory.

Aspect 1

In aspect 1, an in-vehicle backup control apparatus is provided. The in-vehicle backup control apparatus is to be used in an in-vehicle power supply system including a power supply unit and a power storage unit, and is configured to perform a backup operation of supplying electric power to at least a plurality of target loads based on electric power from the power storage unit during an abnormal state in which the voltage of a conductive path through which electric power from the power supply unit is supplied is less than a threshold value, the in-vehicle backup control apparatus including: a discharge circuit that discharges the power storage unit; and a control unit that controls the discharge circuit, wherein the control unit is configured to: set either one of a superimposable voltage or a supply completion voltage as an interruption threshold value, the superimposable voltage being set as a voltage condition of the power storage unit when electric power is supplied simultaneously to the plurality of target loads during the abnormal state, and the supply completion voltage being set in association with one of the plurality of target loads; and interrupt or delay the supply of electric power to the one of the plurality of target loads to prohibit the plurality of target loads from simultaneously operating if the following condition is satisfied: a charge voltage of the power storage unit reaches a value less than or equal to the interruption threshold value during the abnormal state.

The in-vehicle backup control apparatus according to Aspect 1 described above can perform the backup operation that uses the power storage unit during the abnormal state in which the supply of electric power from the power supply unit is stopped, and supply electric power to the plurality of loads more appropriately during the backup operation. With the backup control apparatus, problems caused as a result of the plurality of target loads simultaneously operating when the charge voltage of the power storage unit is relatively low are unlikely to occur. Furthermore, the backup control apparatus sets either one of the superimposable voltage or the supply completion voltage as the interruption threshold value by prioritizing either one of the superimposable voltage or the supply completion voltage.

Aspect 2

In Aspect 2, the in-vehicle backup control apparatus according to Aspect 1 has the following features. The plurality of target loads include a first target load and a second target load. The control unit interrupts or delays the supply of electric power to the second target load if the first target load is not in an operation completed state, and a condition for the first target load to operate is satisfied when the charge voltage of the power storage unit is greater than the supply completion voltage set in association with the second target load and is less than or equal to the superimposable voltage.

The in-vehicle backup control apparatus according to Aspect 2 can preferentially cause the first target load to operate as long as the charge voltage of the power storage unit is less than or equal to the superimposable voltage even when the charge voltage of the power storage unit is greater than the supply completion voltage that is set in association with the second target load. Accordingly, with the backup control apparatus, the problem of an insufficient supply of electric power to the first target load caused as a result of the first target load and the second target load both operating when the charge voltage of the power storage unit is less than or equal to the superimposable voltage is unlikely to occur.

Aspect 3

In Aspect 3, the in-vehicle backup control apparatus according to Aspect 1 or Aspect 2 has the following features. The control unit calculates the supply completion voltage of the target load based on a required energy amount determined based on a power consumption of the target load and a scheduled number of operations, output power from the discharge circuit, an electrostatic capacity of the power storage unit, and the charge voltage of the power storage unit when the abnormal state has occurred.

The in-vehicle backup control apparatus according to Aspect 3 can appropriately set the supply completion voltage of the target load by reflecting the power consumption of the target load and the scheduled number of operations, and taking into consideration the output voltage of the discharge circuit, the electrostatic capacity of the power storage unit, and the charge voltage of the power storage unit when the abnormal state has occurred.

Aspect 4

In Aspect 4, the in-vehicle backup control apparatus according to any one of Aspects 1 to 3 has the following features. The control unit sets the superimposable voltage based on an addition value obtained by adding together a predetermined lower limit voltage, a voltage decrease amount in the power storage unit that is expected when the plurality of target loads operate simultaneously for a predetermined length of time, and a voltage drop in the power storage unit when the plurality of target loads operate simultaneously.

With the in-vehicle backup control apparatus according to Aspect 4, as long as the charge voltage of the power storage unit is greater than the addition value, even when the plurality of target loads operate simultaneously for a predetermined length of time, the charge voltage of the power storage unit is unlikely to reach the lower limit voltage. Accordingly, by setting the superimposable voltage based on the addition value, a situation is unlikely to occur where the plurality of target loads simultaneously operate and the charge voltage of the power storage unit falls below the lower limit voltage.

Aspect 5

In Aspect 5, the in-vehicle backup control apparatus according to Aspect 4 has the following features. The in-vehicle backup control apparatus includes a temperature detection unit that detects the temperature of the power storage unit. The control unit increases the lower limit voltage as the temperature of the power storage unit decreases.

The in-vehicle backup control apparatus according to Aspect 5 can reflect the actually detected temperature of the power storage unit and increase the lower limit voltage as the temperature of the power storage unit decreases. That is, the backup control apparatus can increase the superimposable voltage to as the actually detected temperature of the power storage unit decreases.

Aspect 6

An in-vehicle backup apparatus according to Aspect 6 includes the in-vehicle backup control apparatus according to any one of Aspects 1 to 5; and the power storage unit.

The in-vehicle backup apparatus according to Aspect 6 produces the same advantageous effects as those of the backup control apparatus according to [1].

First Embodiment

Configuration of In-vehicle Power Supply System

Figure 1:
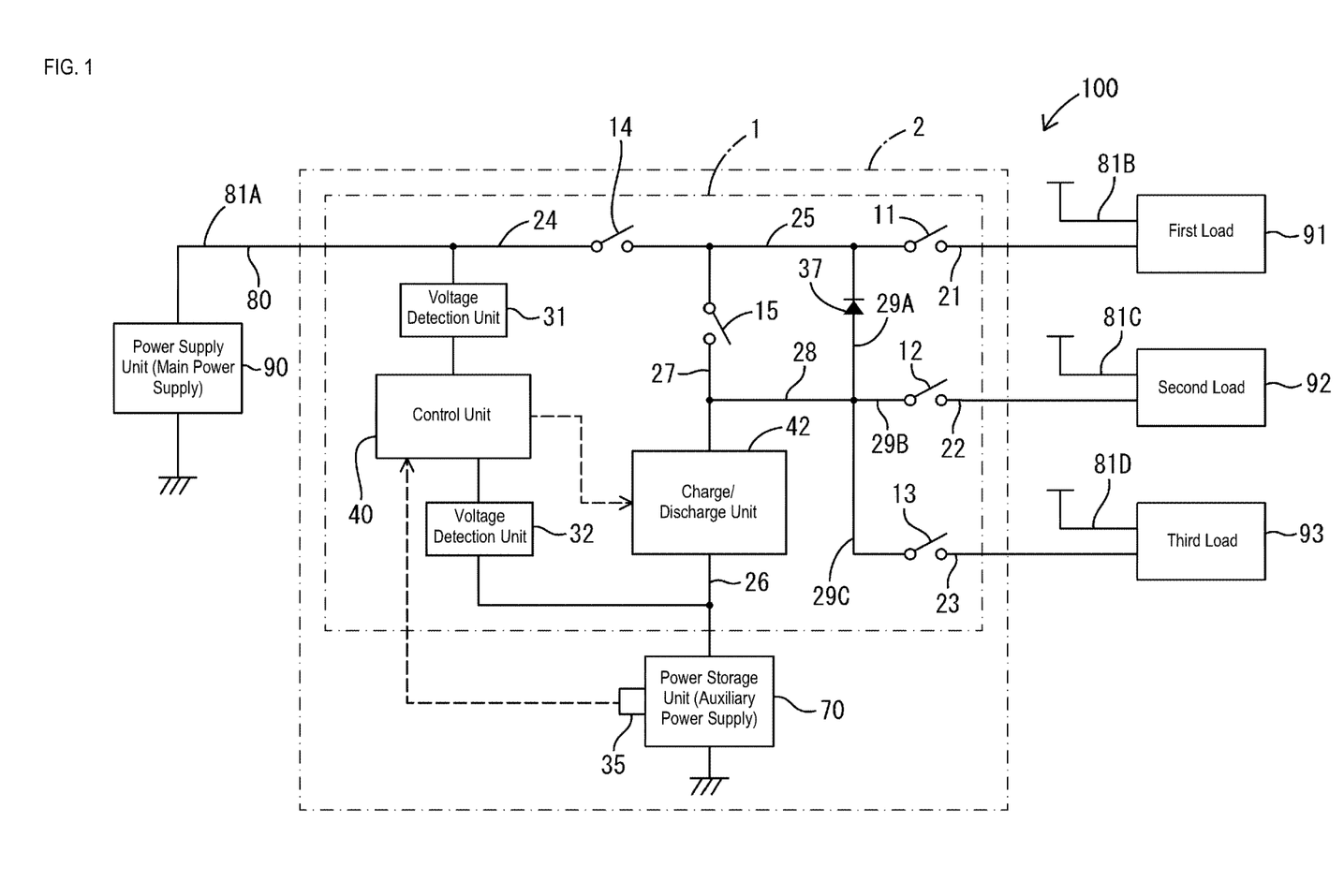
FIG. 1 is a block diagram schematically showing an in-vehicle power supply system that includes an in-vehicle backup control apparatus according to a first embodiment.

An in-vehicle power supply system 100 shown in FIG. 1 includes a power supply unit 90, a first load 91, a second load 92, a third load 93, a power storage unit 70, and an in-vehicle backup control apparatus 1. The in-vehicle backup control apparatus 1 may also be referred to as "backup control apparatus 1". The power storage unit 70 and the backup control apparatus 1 constitute an in-vehicle backup apparatus 2. The in-vehicle backup apparatus 2 may also be referred to as "backup apparatus 2".

The power supply unit 90 functions as a main power supply that continuously supplies electric power when a vehicle to which the in-vehicle power supply system 100 is mounted is started up. The power supply unit 90 is a DC power supply that generates a DC voltage. The power supply unit 90 includes, for example, a battery such as a lead battery. A high-potential terminal of the power supply unit 90 is electrically connected to an electric power path 80 and a low-potential terminal of the power supply unit 90 is electrically connected to the ground. The power supply unit 90 applies a predetermined voltage to the electric power path 80. In the specification of the present application, unless otherwise stated, the term "voltage" refers to a voltage based on the ground.

The power supply unit 90 is electrically connected to the first load 91, the second load 92, and the third load 93 via the electric power path 80. Electric power from the power supply unit 90 is supplied to the first load 91, the second load 92, and the third load 93 via the electric power path 80. In the example shown in FIG. 1, the electric power path 80 includes: an electric power path 81A that is a conductive path connected directly to the power supply unit 90; an electric power path 81B that is connected to the first load 91; an electric power path 81C that is a conductive path connected to the second load 92; and an electric power path 81D that is a conductive path connected to the third load 93. The electric power paths 81A, 81B, 81C, and 81D are electrically connected to each other. In a state in which electric power is supplied from the power supply unit 90 to the first load 91, the second load 92, and the third load 93, the electric power paths 81A, 81B, 81C, and 81D have the same potential. The electric power path 80 includes a relay, a fuse, and the like that are not shown in the diagram, and these devices have a function of interrupting the electrical connection of the electric power path 80.

The first load 91, the second load 92, and the third load 93 are in-vehicle electric devices. The first load 91, the second load 92, and the third load 93 are loads that need to be supplied with electric power during an abnormal state (failure state) in which the supply of electric power from the power supply unit 90 is stopped. The first load 91, the second load 92, and the third load 93 may be, for example, actuators such as motors. Alternatively, the first load 91, the second load 92, and the third load 93 may be ECUs or actuators included in an electric parking brake system, ECUs or actuators included in a shift-by-wire control system, or the like. Alternatively, the first load 91, the second load 92, and the third load 93 may be in-vehicle electric devices other than those listed above.

In the specification of the present application, the first load 91 may also be referred to as "load 91" or "first target load 91". The second load 92 may also be referred to as "load 92" or "second target load 92". The third load 93 may also be referred to as "load 93". The first load 91 and the second load 92 correspond to an example of the plurality of target loads.

The backup apparatus 2 is an apparatus that can perform a backup operation of supplying electric power to the first load 91, the second load 92, and the third load 93 based on the electric power of the power storage unit 70 during the abnormal state in which at least the supply of electric power from the power supply unit 90 is stopped. The backup control apparatus 1 is an apparatus that controls the backup operation.

The power storage unit 70 functions as an auxiliary power supply. The power storage unit 70 is a DC power supply that outputs a DC voltage, and may be, for example, an electric double-layer capacitor. The power storage unit 70 is electrically connected to a charge/discharge unit 42 via a conductive path 26, and is charged and discharged via the charge/discharge unit 42. The charge voltage (output voltage) of the power storage unit 70 is a voltage applied to the conductive path 26. A high-potential terminal of the power storage unit 70 is electrically connected to the conductive path 26 to have the same potential as the conductive path 26. A low-potential terminal of the power storage unit 70 is electrically connected to the ground to have the same potential as the ground.

In the backup apparatus 2, in a non-operating state in which a start switch of the vehicle to which the in-vehicle power supply system 100 is mounted is in an off state, the charge voltage (output voltage) of the power storage unit 70 is kept at a voltage lower than or equal to a standby voltage. Then, in response to the start switch of the vehicle being turned on, the backup apparatus 2 charges the power storage unit 70 such that the charge voltage of the power storage unit 70 reaches a voltage higher than or equal to a target voltage that is higher than the standby voltage. When the start switch of the vehicle is in an on state, the charge voltage of the power storage unit 70 is kept at the target voltage unless a failure state occurs. When the start switch of the vehicle is switched from the on state to an off state, the backup apparatus 2 discharges the power storage unit 70 until the charge voltage of the power storage unit 70 reaches a voltage lower than or equal to the standby voltage.

The backup control apparatus 1 includes a control unit 40, a charge/discharge unit 42, switches 11, 12, 13, 14, and 15, voltage detection units 31 and 32, conductive paths 21, 22, 23, 24, 25, 26, 27, 28, 29A, 29B, and 29C, and the like.

The control unit 40 is an information processing apparatus that has an information processing function, a computation function, a control function, and the like. The control unit 40 is composed mainly of, for example, a microcomputer, and includes a computation apparatus such as a CPU (Central Processing Unit), a memory such as a ROM (Read Only Memory) or a RAM (Random Access Memory), an A/D converter, and the like. The control unit 40 has a function of controlling the charge/discharge unit 42 (discharge circuit).

The charge/discharge unit 42 corresponds to an example of the discharge circuit. The charge/discharge unit 42 is configured as a voltage conversion circuit such as, for example, a DC/DC converter. The charge/discharge unit 42 is provided between the conductive path 26 and the conductive path 27. The charge/discharge unit 42 performs a charge operation and a discharge operation for the power storage unit 70. As the charge operation, the charge/discharge unit 42 performs a voltage conversion operation of stepping up or down a voltage applied to the conductive path 27 and applying the voltage to the conductive path 26. The charge operation performed by the charge/discharge unit 42 is controlled by the control unit 40. The control unit 40 switches the switches 14 and 15 to an on state when causing the charge/discharge unit 42 to perform the charge operation. As the discharge operation, the charge/discharge unit 42 performs a voltage conversion operation of stepping up or down a voltage applied to the conductive path 26 and applying the voltage to the conductive path 27. The discharge operation of the charge/discharge unit 42 is controlled by the control unit 40. The control unit 40 switches, for example, the switches 14 and 15 to an off state and at least one of the switches 11, 12, and 13 to an on state when causing the charge/discharge unit 42 to perform the discharge operation.

The voltage detection units 31 and 32 are configured as, for example, voltage detection circuits. The voltage detection unit 31 detects the voltage of the conductive path 24. The conductive path 24 is a conductive path that is electrically connected to the electric power path 80 to have the same potential as the electric power path 80. Accordingly, the voltage detection unit 31 can detect the voltage of the electric power path 80. The voltage detection unit 32 detects the voltage of the conductive path 26. The conductive path 26 is a conductive path that is electrically connected to the high-potential terminal of the power storage unit 70 to have the same potential as the high-potential terminal of the power storage unit 70. Accordingly, the voltage detection unit 32 can detect the charge voltage (output voltage) of the power storage unit 70. The charge voltage of the power storage unit 70 is the voltage of the high-potential terminal of the power storage unit 70 that is based on the ground.

The conductive path 25 is a conductive path connected to the conductive path 24 via the switch 14. When the switch 14 is in an on state, the conductive path 24 and the conductive path 25 are electrically connected to each other to have the same potential. The conductive path 27 is a conductive path connected to the conductive path 25 via the switch 15. The conductive path 27 is a conductive path electrically connected to one end of the charge/discharge unit 42. When the switch 15 is in an on state, the conductive path 25 and the conductive path 27 are electrically connected to each other to have the same potential. The conductive path 26 is a conductive path electrically connected to the other end of the charge/discharge unit 42. The conductive path 28 is a conductive path with one end being electrically connected to the conductive path 27 and the other end being electrically connected to the conductive paths 29A, 29B, and 29C. The conductive paths 27, 28, 29A, 29B, and 29C have the same potential. One end of the conductive path 29A is electrically connected to the conductive path 28, and the other end of the conductive path 29A is electrically connected to an anode of a diode 37. The diode 37 includes a cathode that is electrically connected to the conductive path 25. The conductive path 21 is a conductive path between the switch 11 and the first load 91. When the switch 11 is in an on state, the conductive path 25 and the conductive path 21 have the same potential. One end of the conductive path 29B is electrically connected to the conductive path 28, and the other end of the conductive path 29B is electrically connected to the switch 12. When the switch 12 is in an on state, the conductive path 29B and the conductive path 22 have the same potential. One end of the conductive path 29C is electrically connected to the conductive path 28, and the other end of the conductive path 29C is electrically connected to the switch 13. When the switch 13 is in an on state, the conductive path 29C and the conductive path 23 have the same potential.

Operation of Backup Control Apparatus

Figure 2:
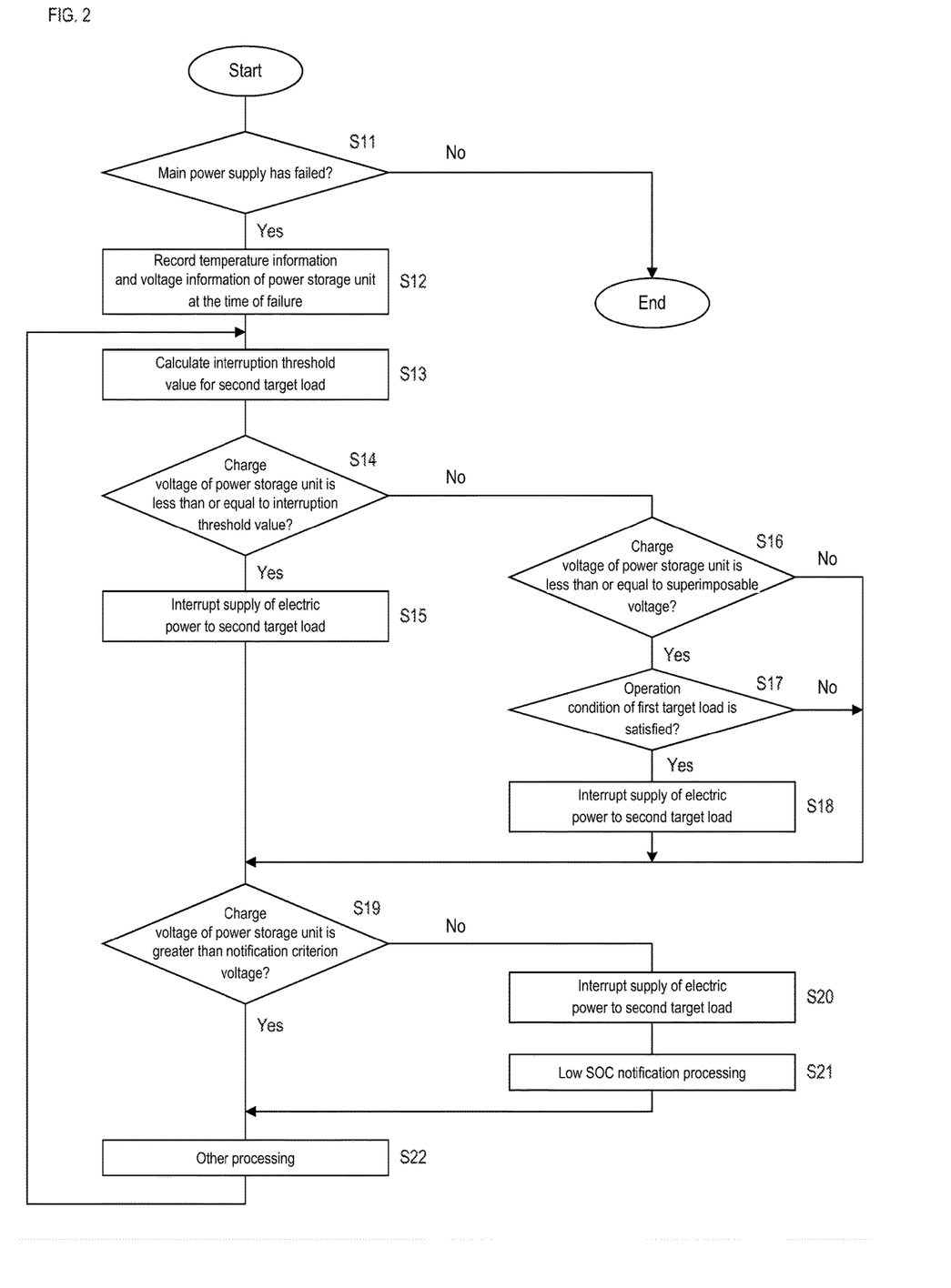
FIG. 2 is a flowchart illustrating a flow of control performed by the in-vehicle backup control apparatus according to the first embodiment.

FIG. 2 shows an example of backup control performed by the control unit 40. The control unit 40 starts the backup control shown in FIG. 2 when a predetermined start condition is satisfied. The start condition for starting the backup control shown in FIG. 2 may be, for example, that the start switch of the vehicle to which the in-vehicle power supply system 100 is mounted is switched from an off state to an on state, or may be another condition. In a typical example described below, a configuration is used in which, when the start switch of the vehicle is switched from an off state to an on state, a start signal indicating that the start switch has been switched to an on state is transmitted from an external apparatus (for example, an external ECU (Electronic Control Unit)) to the control unit 40. The control unit 40 starts the backup control shown in FIG. 2 upon receiving the start signal.

When the control unit 40 starts the backup control shown in FIG. 2, in step S11, the control unit 40 determines whether or not the power supply unit 90 (main power supply) is in a failure state. The control unit 40 determines, based on the voltage detected by the voltage detection unit 31, whether or not the voltage of the conductive path 24 is less than a threshold value. The threshold value is a value that is much smaller than the output voltage applied to the electric power path 80 when the power supply unit 90 is in normal operation and is greater than 0. If it is determined in step S11 that the voltage of the conductive path 24 is less than the threshold value (Yes in step S11), the control unit 40 advances the processing to step S12. This typical example corresponds to an example of the abnormal state in which the voltage of the conductive path 24 is less than the threshold value, or in other words, the voltage of the electric power path 80 is less than the threshold value. If it is determined in step S11 that the voltage of the conductive path 24 is greater than or equal to the threshold value (No in step S11), the control unit 40 ends the backup control shown in FIG. 2. When No is determined in step S11 and the backup control (shown in FIG. 2) ends, the control unit 40 instantly starts the backup control shown in FIG. 2. Accordingly, the backup control shown in FIG. 2 and the determination processing in step S11 are repeatedly performed at a short time interval unless the power supply unit 90 is in the above-described abnormal state.

For example, in the abnormal state in which the supply of electric power from the power supply unit 90 to the conductive path 24 and the supply of electric power to the electric power paths 81B, 81C, and 81D are stopped due to the occurrence of a ground fault, disconnection, or the like in the electric power path 80, the voltage of the conductive path 24 is about 0 V. In this case, in the backup control apparatus 1, the control unit 40 causes the charge/discharge unit 42 to perform the discharge operation of supplying electric power to the conductive path 27, and also performs the processing operations in step S12 and subsequent steps, and the backup operation of supplying electric power to the plurality of loads 91, 92, and 93 based on the electric power from the power storage unit 70. Hereinafter, an example will be described in which electric power is supplied to the loads 91 and 92 that serve as target loads if a failure occurs in the main power supply. In the case where the backup operation of supplying electric power to the plurality of loads 91 and 92 is performed, the switches 11 and 12 may be switched to an on state in step S12. Alternatively, the switches 11 and 12 may be switched to an on state shortly before or shortly after step S12. During normal operation in which the power storage unit 70 is not charged (the main power supply is not in a failure state), the charge/discharge unit 42 may continuously perform an operation of applying a predetermined voltage to the conductive path 27 while the switches 12, 13, and 15 are in an off state, or may start the operation of applying a predetermined voltage to the conductive path 27 after Yes has been determined in step S11.

If it is determined in step S11 that the voltage of the conductive path 24 is less than the threshold value (Yes in step S11), in step S12, the control unit 40 records temperature Tc of the power storage unit 70 and charge voltage Vb of the power storage unit 70. The temperature Tc of the power storage unit 70 and the charge voltage Vb of the power storage unit 70 obtained in step S12 are stored in a storage unit (not shown). The backup apparatus 2 shown in FIG. 1 includes a temperature detection unit 35 that detects the temperature Tc of the power storage unit 70 (for example, the surface temperature or the internal temperature of the power storage unit 70). The control unit 40 acquires information regarding the temperature detected by the temperature detection unit 35 in step S12, and stores the temperature Tc of the power storage unit 70 in the storage unit.

After step S12, in step S13, the control unit 40 calculates an interruption threshold value for the second target load 92.

In the case of the abnormal state occurring when the processing operations in step S13 and subsequent steps are performed, the control unit 40 sets either one of superimposable voltage Ve or supply completion voltage Vg as the interruption threshold value. The superimposable voltage Ve is a voltage that is set as a voltage condition of the power storage unit 70 when electric power is supplied simultaneously to the plurality of target loads (the first target load 91 and the second target load 92). The supply completion voltage Vg is a voltage that is set in association with the second target load 92.

The control unit 40 sets the supply completion voltage Vg of the second target load 92 in the following manner. The control unit 40 first calculates required energy amount E. For calculating the required energy amount, required energy amounts of the loads 91, 92, and 93 are determined in the following manner. Required energy amount E1 of the load 91 is determined using the equation: $X1 \times N1$ based on power consumption X1 consumed by the load 91 to perform a single operation and scheduled number of operations N1. Required energy amount E2 of the load 92 is determined using the equation: $X2 \times N2$ based on power consumption X2 consumed by the load 92 to perform a single operation and scheduled number of operations N2. Required energy amount E3 of the load 93 is determined using the equation: $X3 \times N3$ based on power consumption X3 consumed by the load 93 to perform a single operation and scheduled number of operations N3. The required energy amounts E, E1, E2, and E3 are expressed in the unit of, for example, mAh. The power consumptions X1, X2, and X3 are expressed in the unit of, for example, mAh.

In the case where the control unit 40 calculates the supply completion voltage Vg of the second target load 92 in step S13, if the load 91 and load 93 are in an unoperated state when step S13 is performed, the required energy amount E is calculated using the equation: $E = E2 + Ic \times (Tm - Tr)$ based on the required energy amount E2 of the load 92. Ic represents the current consumption of the backup apparatus 2 per unit time, and is, for example, a predetermined value. Ic is expressed in the unit of, for example, mA/s. Tm represents a predetermined maximum operation time that is pre-set as the maximum time during which the backup apparatus 2 operates. Tr represents an elapsed operation time from the time when Yes is determined in step S11 (when it is determined that a failure has occurred in the power supply unit 90) to the time when the required energy amount E is calculated in step S13. Tm and Tr are expressed in the unit of, for example, s.

In the case where the control unit 40 calculates the supply completion voltage Vg of the second target load 92 in step S13, if the load 91 is in an unoperated state and the load 93 is in an operation completed state when step S13 is performed, the required energy amount E is calculated using the equation: $E = E2 + E3 + Ic \times (Tm - Tr)$ based on the required energy amount E2 of the load 92 and the required energy amount E3 of the load 93.

In the case where the control unit 40 calculates the supply completion voltage Vg of the second target load 92 in step S13, if the load 91 is in an operation completed state and the load 93 is in an unoperated state when step S13 is performed, the required energy amount E is calculated using the equation: $E = E2 + E1 + Ic \times (Tm - Tr)$ based on the required energy amount E1 of the load 91 and the required energy amount E2 of the load 92.

In the case where the control unit 40 calculates the supply completion voltage Vg of the second target load 92 in step S13, if the loads 91 and 93 are in an operation completed state when step S13 is performed, the required energy amount E is calculated using the equation: $E = E1 + E2 + E3 + Ic \times (Tm - Tr)$ based on the required energy amount E1 of the load 91, the required energy amount E2 of the load 92, and the required energy amount E3 of the load 93.

When the control unit 40 calculates the required energy amount E in step S13, the control unit 40 calculates Z (J) based on the equation: $E(mAh) \times Vc(V) = Z(J)$. Vc(V) represents the output voltage applied to the conductive path 27 by the charge/discharge unit 42. Then, estimated voltage Va after discharge is calculated based on the equation: $Z(J) = C \times A \times B \times (Vb2 - Va2)/2$. Va represents the supply completion voltage Vg that is set in association with the second target load 92. The value of A in the equation is a degradation state coefficient. The degradation state coefficient (degradation coefficient) may be calculated and set using known methods, or may be a predetermined value. The value of B in the equation is the discharge efficiency of the charge/discharge unit 42. The discharge efficiency may be calculated and set using known methods, or may be a predetermined value. The value of C in the equation is the electrostatic capacity of the power storage unit 70. The control unit 40 can detect the electrostatic capacity C using a known method. The control unit 40 can detect the electrostatic capacity C at a predetermined timing (for example, each time the charge/discharge unit 42 performs an operation). In step S13, the most recently detected electrostatic capacity C is used.

As described above, the control unit 40 calculates the supply completion voltage Vg of the second target load 92 based on the required energy amount E based on the required energy amount E2, the output power from the charge/discharge unit 42 (discharge circuit), the electrostatic capacity C of the power storage unit 70, and the charge voltage Vb of the power storage unit 70 when the abnormal state has occurred.

The control unit 40 calculates the superimposable voltage Ve in the manner described below. The control unit 40 sets the superimposable voltage Ve based on an addition value (Vx+Vy+Vz) obtained by adding together a predetermined lower limit voltage Vx, a voltage decrease amount Vy in the power storage unit 70 that is expected when the plurality of target loads (the first target load 91 and the second target load 92) operate simultaneously for a predetermined length of time, and a voltage drop Vz in the power storage unit 70 when the plurality of target loads (the first target load 91 and the second target load 92) operate simultaneously. In the example given below, it is assumed that Ve=Vx+Vy+Vz. However, the present disclosure is not limited to this example, and the superimposable voltage Ve may be set by adding a correction value to the addition value or multiplying the addition value by a coefficient.

The lower limit voltage Vx is a lower limit value of the input voltage (the voltage of the conductive path 26) required by the charge/discharge unit 42 to supply predetermined power (a predetermined output voltage and a predetermined output current). The lower limit voltage Vx may be a predetermined fixed value, or may be set based on the temperature Tc of the power storage unit 70. In the case where the lower limit voltage Vx is set based on the temperature Tc, the control unit 40 may set the lower limit voltage Vx in accordance with the temperature Tc based on the temperature Tc of the power storage unit 70 detected by the temperature detection unit 35 by referencing a predetermined computation equation or a predetermined table that increases the lower limit voltage Vx as the lower the temperature Tc of the power storage unit 70 decreases.

The voltage decrease amount Vy can be set using, for example, $Vy=((\alpha+\beta)\times Ty)/(C\times Dt)$. $\alpha$ represents a load current of the first load 91, and $\beta$ represents a load current of the second load 92. $\alpha$ and $\beta$ may be, for example, expected current values, and may be set as fixed values. Ty represents the occurrence time of an inrush current. Ty may be an expected period of time, and may be set as a fixed value. Dt represents a temperature coefficient. The control unit 40 sets the temperature coefficient Dt in accordance with the temperature Tc based on a predetermined computation equation or a predetermined table. In this example, Vy is set in accordance with the temperature Tc using the above-described computation equation, but may be a fixed value.

Vz can be obtained using, for example, $Vz=(\alpha+\beta)\times(Rc\times Ft)$. Rc represents the internal resistance of the power storage unit 70. The control unit 40 can detect the internal resistance Rc using a known method. The control unit 40 can detect the internal resistance Rc at a predetermined timing (for example, each time the charge/discharge unit 42 performs an operation). In step S13, the most recently detected internal resistance Rc is used. Ft represents a temperature coefficient. The control unit 40 sets the temperature coefficient Ft in accordance with the temperature Tc based on a predetermined computation equation or a predetermined table.

After the supply completion voltage Vg and the superimposable voltage Ve have been calculated in step S13, the control unit 40 determines whether or not Vg<Ve is satisfied. If it is determined that Vg<Ve is satisfied, the control unit 40 sets Vg as the interruption threshold value. If it is determined that Vg≥Ve is satisfied, the control unit 40 sets Ve as the interruption threshold value.

After step S13, in step S14, the control unit 40 determines whether or not the charge voltage (output voltage) of the power storage unit 70 is less than or equal to the interruption threshold value. If it is determined in step S14 that the charge voltage of the power storage unit 70 is less than or equal to the interruption threshold value, in step S15, the control unit 40 interrupts the supply of electric power to the second target load 92. In the case where the control unit 40 interrupts the supply of electric power to the second target load 92 in step S15, the control unit 40 switches the switch 12 to an off state. In this case, the control unit 40 causes the charge/discharge unit 42 to continuously perform the operation of applying a predetermined voltage to the conductive path 27. When the switch 11 is in an on state, electric power is supplied to the first target load 91. When the switch 11 is in an off state, the supply of electric power to the first target load 91 is interrupted. In this case, the control unit 40 can control the on state and the off state of the switch 11 in response to, for example, an instruction from an external apparatus.

If it is determined in step S14 that the charge voltage of the power storage unit 70 is not less than or equal to the interruption threshold value, in step S16, the control unit 40 determines whether or not the charge voltage of the power storage unit 70 is less than or equal to the superimposable voltage Ve. If it is determined in step S16 that the charge voltage of the power storage unit 70 is less than or equal to the superimposable voltage Ve, in step S17, the control unit 40 determines whether or not the operation condition of the first target load 91 is satisfied. The expression "the operation condition of the first target load 91 is satisfied" means that the first target load 91 is not in an operation completed state, and the condition for the first target load 91 to operate is satisfied. The expression "the first target load 91 is in an operation completed state" means that all predetermined operations of the first target load 91 are complete, and thereafter the first target load 91 enters a non-operating state. The expression "the condition for the first target load 91 to operate" refers to a predetermined condition that is pre-set as a start condition for starting the operation of the first target load 91, and may be, for example, that trigger information indicating an instruction to start the operation of the first target load 91 is provided from an external apparatus to the control unit 40, or may be another condition. If it is determined in step S17 that the operation condition of the first target load are satisfied, in step S18, the control unit 40 interrupts the supply of electric power to the second target load 92. In the case where the control unit 40 interrupts the supply of electric power to the second target load 92 in step S18, the control unit 40 switches the switch 12 to an off state. In this case, the control unit 40 causes the charge/discharge unit 42 to continuously perform the operation of applying a predetermined voltage to the conductive path 27. When the switch 11 is in an on state, electric power is supplied to the first target load 91. When the switch 11 is in an off state, the supply of electric power to the first target load 91 is interrupted. In this case, the control unit 40 can control the on state and the off state of the switch 11 in response to, for example, an instruction from an external apparatus. If No is determined after step S15, after step S18, or in step S16 or S17, the control unit 40 advances the processing to step S19.

In step S19, the control unit 40 determines whether or not the charge voltage (output voltage) of the power storage unit 70 is greater than notification criterion voltage Vd. If it is determined in step S19 that the charge voltage (output voltage) of the power storage unit 70 is not greater than the notification criterion voltage Vd, in step S20, the control unit 40 interrupts the supply of electric power to the second target load 92. Then, in step S21, the control unit 40 performs processing for transmitting a notification indicating that the SOC of the power storage unit 70 is has decreased.

When it is determined in step S19 that the charge voltage (output voltage) of the power storage unit 70 is greater than the notification criterion voltage Vd, or after step S21, in step S22, the control unit 40 performs other processing, and then returns the processing to step S13.

As described above, the control unit 40 interrupts or delays the supply of electric power to one of the plurality of target loads (the first target load 91 and the second target load 92) to prohibit the plurality of target loads from simultaneously operating if the following condition is satisfied: the charge voltage of the power storage unit 70 reaches a value less than or equal to the interruption threshold value during the above-described abnormal state. Then, the control unit 40 interrupts the supply of electric power to the second target load 92 if the first target load 91 is not in an operation completed state, and the condition for the first target load 91 to operate is satisfied when the charge voltage of the power storage unit 70 is greater than the supply completion voltage Vg that is set in association with the second target load 92 and is less than or equal to the superimposable voltage Ve.

An example of advantageous effects of the present configuration will be described next.

The backup control apparatus 1 can perform the backup operation that uses the power storage unit 70 during the abnormal state in which the supply of electric power from the power supply unit 90 is stopped, and supply electric power to the plurality of loads 91, 92, and 93 more appropriately during the backup operation. In the backup control apparatus 1, problems caused as a result of the plurality of target loads (the first target load 91 and the second target load 92) simultaneously operating when the charge voltage of the power storage unit 70 is relatively low are unlikely to occur. Furthermore, the backup control apparatus 1 can set either one of the superimposable voltage or the supply completion voltage as the interruption threshold value by prioritizing either one of the superimposable voltage or the supply completion voltage.

The backup control apparatus 1 can preferentially cause the first target load 91 to operate as long as the charge voltage of the power storage unit 70 is less than or equal to the superimposable voltage even when the charge voltage of the power storage unit 70 is greater than the supply completion voltage that is set in association with the second target load 92. Accordingly, with the backup control apparatus 1, the problem of an insufficient supply of electric power to the first target load 91 caused as a result of the first target load 91 and the second target load 92 both operating when the charge voltage of the power storage unit 70 is less than or equal to the superimposable voltage is unlikely to occur.

The backup control apparatus 1 can appropriately set the supply completion voltage of the target load by reflecting the power consumption of the target load and the scheduled number of operations, and taking into consideration the output voltage of the charge/discharge unit 42 (discharge circuit), the electrostatic capacity of the power storage unit 70, and the charge voltage of the power storage unit 70 when the abnormal state has occurred.

With the backup control apparatus 1, as long as the charge voltage of the power storage unit 70 is greater than the addition value, even when the plurality of target loads operate simultaneously for a predetermined length of time, the charge voltage of the power storage unit 70 is unlikely to reach the lower limit voltage. Accordingly, by setting the superimposable voltage based on the addition value, a situation is unlikely to occur where the plurality of target loads simultaneously operate and the charge voltage of the power storage unit falls below the lower limit voltage.

The backup control apparatus 1 can reflect the actually detected temperature of the power storage unit 70 and increase the lower limit voltage as the temperature of the power storage unit 70 decreases. That is, the backup control apparatus 1 can increase the superimposable voltage as the actually detected temperature of the power storage unit 70 decreases.

Other Embodiments

The present disclosure is not limited to the embodiment and the drawings described above. For example, the features of the embodiment described above and embodiments described below can be combined in any way as long as the combination is not contradictory. Also, any of the features of the embodiment described above and embodiments described below can be omitted unless it is clearly stated that they are essential. Furthermore, the embodiment described above may be changed as described below.

In the embodiment given above, an example was described in which the control unit 40 interrupts or delays the supply of electric power to one of the plurality of target loads to prohibit the plurality of target loads from simultaneously operating if the following condition is satisfied: the charge voltage of the power storage unit 70 reaches a value less than or equal to the interruption threshold value during the abnormal state, but the present disclosure is not limited to the example described above. The control unit 40 may be configured to, if the charge voltage of the power storage unit 70 reaches a value less than or equal to the interruption threshold value during the abnormal state, completely interrupt the supply of electric power to one of the plurality of target loads, and supply no electric power to the target load to which the supply of electric power was interrupted during the subsequent backup operation. Alternatively, the control unit 40 may be configured to, if the charge voltage of the power storage unit 70 reaches the interruption threshold value, temporarily delay the supply of electric power to one of the plurality of target loads to prevent electric power from being simultaneously supplied to the plurality of target loads, and supply electric power when the other target load finishes performing an operation.

In the first embodiment given above, the start switch of the vehicle was described. The start switch may be an ignition switch. Alternatively, in the case where the vehicle is an electric vehicle or the like, the start switch may be a power switch for activating an EV system.

In the first embodiment given above, the power supply unit is a lead battery, but the power supply unit is not limited to a lead battery. The power supply unit may be, for example, another type of battery such as a lithium ion battery, or may be a power supply such as an alternator or a converter.

In the first embodiment given above, the power storage unit is an electric double-layer capacitor. However, the power storage unit is not limited to an electric double-layer capacitor. The power storage unit may be another type of power storage unit such as a lithium ion capacitor or a lithium ion battery.

In the first embodiment given above, the backup control apparatus performs the backup operation when the supply of electric power from the power supply unit is stopped, but the backup control apparatus may perform the backup operation of supplying electric power from the power storage unit in a predetermined state in which the supply of electric power from the power supply unit is not completely stopped.

In the first embodiment given above, an example of the method for setting the superimposable voltage was described, but the present disclosure is not limited to this example. The superimposable voltage may be a value corrected using a method obtained by slightly changing the method described in the first embodiment, for example, a method in which the superimposable voltage obtained using the method described in the first embodiment is multiplied by a coefficient, or a correction value corresponding to a margin is added, or may be a predetermined fixed value. In the first embodiment given above, an example of the method for setting the supply completion voltage in association with the second target load 92 was described, but the present disclosure is not limited to this example. The supply completion voltage that is set in association with the second target load 92 may be a value corrected using a method obtained by slightly changing the method described in the first embodiment, for example, a method in which the supply completion voltage obtained using the method described in the first embodiment is multiplied by a coefficient, or a correction value for a margin is added, or may be a fixed value pre-set in association with the second target load 92.

The embodiments disclosed herein should be considered illustrative in all aspects and not restrictive. The scope of the present disclosure is not limited to the embodiments disclosed herein, and all changes that come within the scope indicated by the appended claims or the scope of equivalency of the appended claims are intended to be embraced within the scope of the present disclosure.

What is claimed is:

1. An in-vehicle backup control apparatus to be used in an in-vehicle power supply system including a power supply unit and a power storage unit, and is configured to perform a backup operation of supplying electric power to at least a plurality of target loads based on electric power from the power storage unit during an abnormal state, wherein an abnormal state is a state in which the supply of electric power from the power supply unit is stopped, and in which the voltage of a conductive path through which electric power from the power supply unit is supplied is less than a threshold value, the in-vehicle backup control apparatus comprising:

a DC/DC converter that charges and discharges the power storage unit; and a control unit that controls a charging and discharging operation of the DC/DC converter by stepping up or stepping down a voltage applied to the conductive path, wherein the control unit is configured to:

set either one of a superimposable voltage or a supply completion voltage as an interruption threshold value, the superimposable voltage being set as a voltage condition of the power storage unit when electric power is supplied simultaneously to the plurality of target loads during the abnormal state, and the supply completion voltage being set in association with one of the plurality of target loads; and interrupt or delay the supply of electric power to the one of the plurality of target loads to prohibit the plurality of target loads from simultaneously operating if the following condition is satisfied: a charge voltage of the power storage unit reaches a value less than or equal to the interruption threshold value during the abnormal state.

2. The in-vehicle backup control apparatus according to claim 1, wherein the control unit interrupts the supply of electric power to the one of the plurality of target loads to prohibit the plurality of target loads from simultaneously operating if the following condition is satisfied: the charge voltage of the power storage unit reaches a value less than or equal to the interruption threshold value during the abnormal state.

3. The in-vehicle backup control apparatus according to claim 1, wherein the plurality of target loads include a first target load and a second target load, and the control unit interrupts or delays the supply of electric power to the second target load if the first target load is not in an operation completed state, and a condition for the first target load to operate is satisfied when the charge voltage of the power storage unit is greater than the supply completion voltage set in association with the second target load and is less than or equal to the superimposable voltage.

4. The in-vehicle backup control apparatus according to claim 1, wherein the control unit calculates the supply completion voltage of the target load based on a required energy amount determined based on power consumption of the target load and a scheduled number of operations, output power from the DC/DC converter, the electrostatic capacity of the power storage unit, and the charge voltage of the power storage unit when the abnormal state has occurred.

5. The in-vehicle backup control apparatus according to claim 1, wherein the control unit sets the superimposable voltage based on an addition value obtained by adding together a predetermined lower limit voltage, a voltage decrease amount in the power storage unit that is expected when the plurality of target loads operate simultaneously for a predetermined length of time, and a voltage drop in the power storage unit when the plurality of target loads operate simultaneously.

6. An in-vehicle backup apparatus comprising:

the in-vehicle backup control apparatus according to claim 1; and the power storage unit.

7. The in-vehicle backup control apparatus according to claim 2, wherein the plurality of target loads include a first target load and a second target load, and the control unit interrupts or delays the supply of electric power to the second target load if the first target load is not in an operation completed state, and a condition for the first target load to operate is satisfied when the charge voltage of the power storage unit is greater than the supply completion voltage set in association with the second target load and is less than or equal to the superimposable voltage.

8. The in-vehicle backup control apparatus according to claim 2, wherein the control unit calculates the supply completion voltage of the target load based on a required energy amount determined based on power consumption of the target load and a scheduled number of operations, output power from the DC/DC converter, the electrostatic capacity of the power storage unit, and the charge voltage of the power storage unit when the abnormal state has occurred.

9. The in-vehicle backup control apparatus according to claim 3, wherein the control unit calculates the supply completion voltage of the target load based on a required energy amount determined based on power consumption of the target load and a scheduled number of operations, output power from the DC/DC converter, the electrostatic capacity of the power storage unit, and the charge voltage of the power storage unit when the abnormal state has occurred.

10. The in-vehicle backup control apparatus according to claim 2, wherein the control unit sets the superimposable voltage based on an addition value obtained by adding together a predetermined lower limit voltage, a voltage decrease amount in the power storage unit that is expected when the plurality of target loads operate simultaneously for a predetermined length of time, and a voltage drop in the power storage unit when the plurality of target loads operate simultaneously.

11. The in-vehicle backup control apparatus according to claim 3, wherein the control unit sets the superimposable voltage based on an addition value obtained by adding together a predetermined lower limit voltage, a voltage decrease amount in the power storage unit that is expected when the plurality of target loads operate simultaneously for a predetermined length of time, and a voltage drop in the power storage unit when the plurality of target loads operate simultaneously.

12. The in-vehicle backup control apparatus according to claim 4, wherein the control unit sets the superimposable voltage based on an addition value obtained by adding together a predetermined lower limit voltage, a voltage decrease amount in the power storage unit that is expected when the plurality of target loads operate simultaneously for a predetermined length of time, and a voltage drop in the power storage unit when the plurality of target loads operate simultaneously.

13. The in-vehicle backup apparatus according to claim 6, wherein the control unit interrupts the supply of electric power to the one of the plurality of target loads to prohibit the plurality of target loads from simultaneously operating if the following condition is satisfied:

the charge voltage of the power storage unit reaches a value less than or equal to the interruption threshold value during the abnormal state.

14. The in-vehicle backup apparatus according to claim 6, wherein the plurality of target loads include a first target load and a second target load, and the control unit interrupts or delays the supply of electric power to the second target load if the first target load is not in an operation completed state, and a condition for the first target load to operate is satisfied when the charge voltage of the power storage unit is greater than the supply completion voltage set in association with the second target load and is less than or equal to the superimposable voltage.

15. The in-vehicle backup apparatus according to claim 6, wherein the control unit calculates the supply completion voltage of the target load based on a required energy amount determined based on power consumption of the target load and a scheduled number of operations, output power from the DC/DC converter, the electrostatic capacity of the power storage unit, and the charge voltage of the power storage unit when the abnormal state has occurred.

16. The in-vehicle backup apparatus according to claim 6, wherein the control unit sets the superimposable voltage based on an addition value obtained by adding together a predetermined lower limit voltage, a voltage decrease amount in the power storage unit that is expected when the plurality of target loads operate simultaneously for a predetermined length of time, and a voltage drop in the power storage unit when the plurality of target loads operate simultaneously.

* * * * *